US012745280B2

(12) United States Patent
Sharma et al.

(10) Patent No.: US 12,745,280 B2
(45) Date of Patent: Sep. 22, 2026

(54) WIRELESS NETWORK DATA TRANSFER FROM A DATA STORAGE ELEMENT TO WIRELESS NETWORK APPLICATIONS

(71) Applicant: T-MOBILE INNOVATIONS LLC, Overland Park, KS (US)

(72) Inventors: Anuj Sharma, Broadlands, VA (US); Kumar Pushkar, Herndon, VA (US); Anil Kumar Mariyani, Ashburn, VA (US); Deepesh Belwal, Ashburn, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 512 days.

(21) Appl. No.: 18/452,891

(22) Filed: Aug. 21, 2023

(65) Prior Publication Data

US 2025/0071795 A1 Feb. 27, 2025

(51) Int. Cl.

| | |
|---|---|
| ***H04W 72/00*** | (2023.01) |
| ***H04W 72/56*** | (2023.01) |
| ***H04W 76/10*** | (2018.01) |
| ***H04W 76/50*** | (2018.01) |
| *H04W 80/06* | (2009.01) |

(52) U.S. Cl.

CPC ........... *H04W 72/56* (2023.01); *H04W 76/10* (2018.02); *H04W 76/50* (2018.02); *H04W 80/06* (2013.01)

(58) Field of Classification Search

None

See application file for complete search history.

(56) References Cited

U.S. PATENT DOCUMENTS

| | | | | |
|---|---|---|---|---|
| 4,756,020 | A | 7/1988 | Fodale | |
| 7,483,417 | B2 | 1/2009 | Farris et al. | |
| 9,537,775 | B2 | 1/2017 | McMurry et al. | |
| 11,212,196 | B2 | 12/2021 | Wright et al. | |
| 11,510,127 | B2 | 11/2022 | Qiao et al. | |
| 11,596,023 | B2 | 2/2023 | Palanisamy et al. | |
| 12,335,748 | B2 * | 6/2025 | Trujillo | H04L 45/586 |
| 2019/0174449 | A1 * | 6/2019 | Shan | H04W 60/00 |
| 2019/0182718 | A1 * | 6/2019 | Shan | H04W 8/06 |
| 2021/0204103 | A1 * | 7/2021 | Bartolomé Rodrigo | H04W 4/50 |
| 2022/0248296 | A1 * | 8/2022 | Merwaday | H04W 48/18 |
| 2023/0397086 | A1 * | 12/2023 | Kim | H04W 40/24 |

FOREIGN PATENT DOCUMENTS

| | | | | |
|---|---|---|---|---|
| EP | 3446464 B1 * | 5/2020 | | H04L 47/2416 |
| WO | WO-2021092561 A1 * | 5/2021 | | H04W 76/18 |

* cited by examiner

*Primary Examiner* — Gerald A Smarth

(57) ABSTRACT

In a wireless communication system, wireless network applications determine their priority indicators. The wireless network applications transfer their priority indicators to a data storage element like a Uniform Data Repository (UDR). In response, the data storage element transfers wireless network data to the wireless network applications in a priority order based on the priority indicators.

20 Claims, 11 Drawing Sheets

WIRELESS NETWORK DATA TRANSFER FROM A DATA STORAGE ELEMENT TO WIRELESS NETWORK APPLICATIONS

TECHNICAL BACKGROUND

Wireless communication networks provide wireless data services to wireless communication devices like phones, computers, and other user devices. The wireless data services may include internet-access, data messaging, video conferencing, or some other data communication product. The wireless communication networks comprise wireless access nodes like Wireless Fidelity (WIFI) hotspots and Fifth Generation New Radio (5GNR) cell towers. The wireless communication networks also comprise network elements like Uniform Data Management (UDMs) and Uniform Data Repositories (UDRs). The network elements control the wireless data services that are delivered to the wireless communication devices. For example, the UDM interacts with the UDR to obtain service information for individual wireless network users.

The network elements execute wireless network applications to handle tasks like element provisioning, emergency services, and internet-access slices. The wireless network applications retrieve data from the UDR to perform their network tasks. The wireless network applications also subscribe to event notifications from the UDR like a notification that a wireless communication device is attaching to a wireless communication network.

The UDR may become overloaded or experience network congestion. When the UDR fails to properly serve data to the wireless network applications, the wireless data services that are delivered to the wireless network users are impaired or unavailable. The amount of UDRs and wireless network applications continues to grow rapidly, so the damage caused by degraded UDRs is increasing as well.

Transmission Control Protocol (TCP) supports the Internet Protocol (IP) with connection-based services. TCP allocates data into IP packets and ensures that the IP packets are delivered by using packet acknowledgements. TCP handles packet retransmission and flow control. Transport Layer Security (TLS) comprises a cryptographic protocol to secure IP communications like Hyper-Text Transfer Protocol (HTTP), Voice Over Internet Protocol (VOIP), and data messaging. TLS uses digital certificates to encrypt and decrypt data that is exchanged between internet browsers, web sites, and other computer systems. TLS is often used with TCP. Stream Control Transmission Protocol (SCTP) supports IP communications by ensuring in-sequence delivery of IP packets. SCTP is capable of simultaneously transferring data segments in parallel over multiple IP connections and properly ordering the data segments at the destination. SCTP is often used with User Data Protocol (UDP) to support IP streaming. The UDRs use TCP/TLS/SCTP at the transport layer to perform flow control and reliable delivery.

Unfortunately, the UDRs do not effectively serve their wireless network applications in times of overload and congestion, and the result is service outages to wireless network users. Moreover, the wireless network applications do not efficiently help the UDR manage overloads and congestion. In particular, the wireless network applications rely on transport layer tools like TCP/TLS/SCTP to help with UDR issues, but these tools do not provide effective UDR support at the application layer which better understands UDR priorities.

TECHNICAL OVERVIEW

In some examples, wireless network applications determine their priority indicators. The wireless network applications transfer their priority indicators to a data storage element. The data storage element receives the priority indicators for the wireless network applications, and in response, the data storage element transfers wireless network data to the wireless network applications based on their priority indicators.

In some examples, wireless network applications individually determine application names and individually transfer their application names to a UDR. The UDR determines when the amount of connections from the wireless network applications exceeds a connection threshold. When the amount of the connections from the wireless network applications to the UDR exceeds the connection threshold, the UDR determines priorities based on the application names for the wireless network applications. The UDR transfers the wireless network data to the wireless network applications based on the priorities.

A wireless communication system transfers wireless network data from a Uniform Data Repository (UDR) to wireless network applications. The wireless network applications determine application usernames. The wireless network applications establish connections to the UDR and transfer the application usernames to the UDR over the connections. The UDR receives the application usernames from the wireless network applications over the connections. The UDR determines when the amount of the connections from the wireless network applications exceeds a connection threshold. When the amount of the connections from the wireless network applications to the UDR exceeds the connection threshold, the UDR determines connection priorities based on the application usernames. The UDR transfers the wireless network data to the wireless network applications based on the connection priorities.

DETAILED DESCRIPTION

Figure 1:
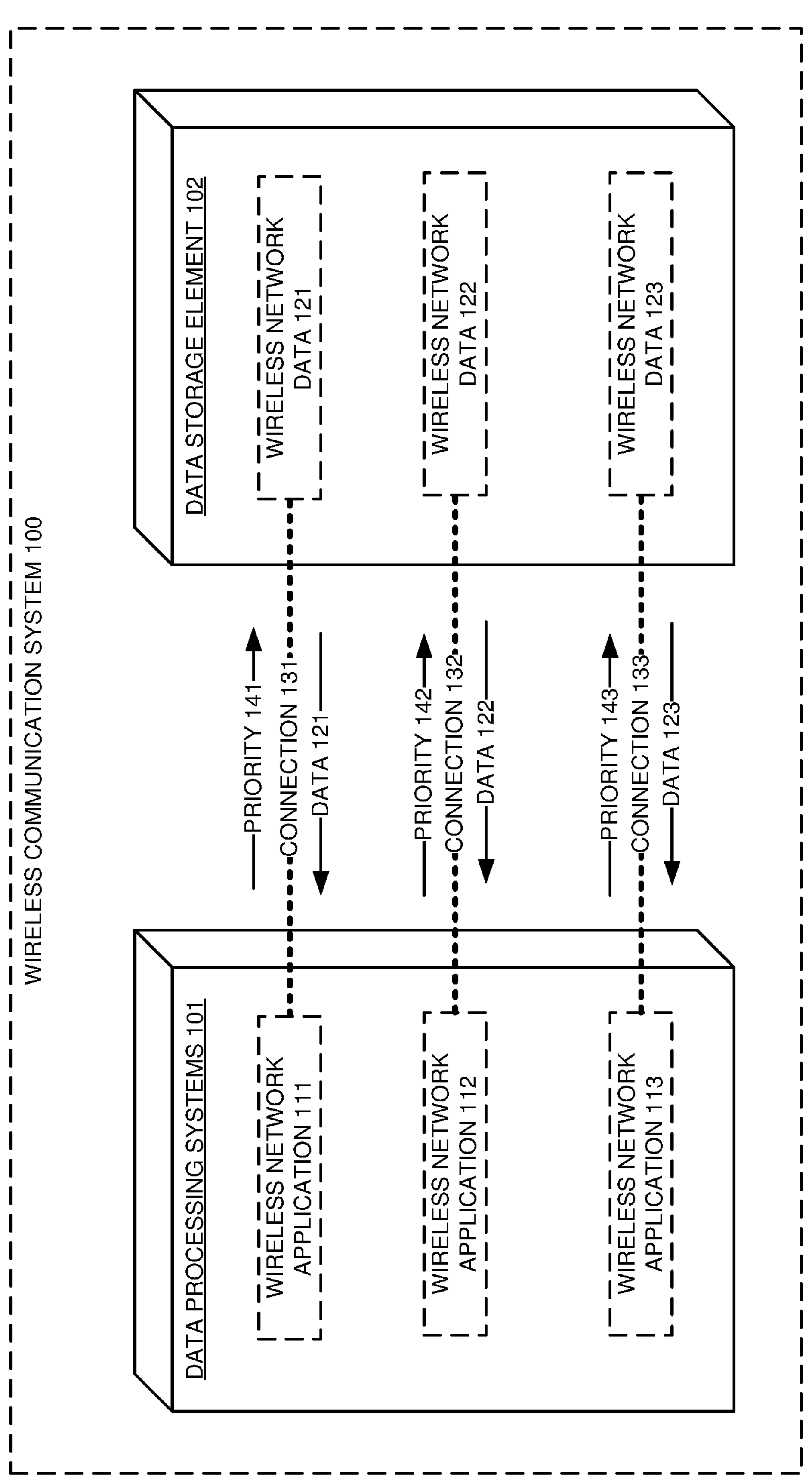
FIG. 1 illustrates an exemplary wireless communication system to transfer wireless network data from a data storage element to wireless network applications.

FIG. 1 illustrates exemplary wireless communication system 100 to transfer wireless network data 121-123 from data storage element 102 to wireless network applications 111-113. Wireless communication system 100 comprises data processing systems 101 and data storage element 102. Data processing systems 101 execute wireless network applications 111-113. Data storage element 102 stores wireless network data 121-123. Wireless network applications 111-113 process wireless network data 121-123 to facilitate the delivery of wireless data services like internet-access, media-conferencing, data messaging, and other wireless data products. The amount of wireless network applications and wireless network data that are shown in FIG. 1 has been restricted for clarity.

In some examples, wireless network applications 111-113 determine their application priority indicators 141-143—possibly with the assistance of data storage element 102. Wireless network application 111 and data storage element 102 establish connection 131. Wireless network application 111 transfers application priority indicator 141 to data storage element 102 over connection 131. Wireless network application 112 and data storage element 102 establish connection 132. Wireless network application 112 transfers application priority indicator 142 to data storage element 102 over connection 132. Wireless network application 113 and data storage element 102 establish connection 133. Wireless network application 112 transfers application priority indicator 143 to data storage element 102 over connection 133. Data storage element 102 receives application priority indicators 141-143 from wireless network applications 111-113 over connections 131-133.

Application priority indicator 141 has the highest priority and is associated with connection 131 and wireless network application 111. Application priority indicator 142 has an average priority and is associated with connection 132 and wireless network application 112. Application priority indicator 143 has the lowest priority and is associated with connection 133 and wireless network application 113. Data storage element 102 transfers wireless network data 121-123 to wireless network applications 111-113 based on application priority indicators 141-143.

When wireless network applications 111-113 contemporaneously request wireless network data 121-123 from data storage element 102, data storage element 102 first transfers wireless network data 121 to wireless network application 111 based on its high priority. Data storage element 102 then transfers wireless network data 122 to wireless network application 112 based on its average priority. Finally, data storage element 102 transfers wireless network data 123 to wireless network application 113 based on its low priority. In some examples, lower priority connections are terminated to help serve higher priority connections.

Data processing systems 101 comprise computers and software, and the software includes wireless network applications 111-113. Wireless network applications 111-113 comprise software modules that perform tasks for network elements. Exemplary network elements include Uniform Data Management (UDMs), Policy Control Functions (PCFs), and Network Exposure Functions (NEFs). Data storage element 102 comprises data memory and memory control software. Data storage element 102 might be a Uniform Data Repository (UDR), Unstructured Data Storage Function (UDSF), or some other network element. Wireless network data 121-123 comprises subscriber data, policy data, application data, structured data, or some other network information.

A wireless priority indicator may be based on an emergency status of its wireless network application, and the data storage element transfers the wireless network data to the wireless network application based on an emergency priority. A wireless priority indicator may be based on an administrative user of its wireless network application, and the data storage element transfers wireless network data to the wireless network application based on an administrative user priority. A wireless priority indicator may be based on a provisioning capability for its wireless network application, and the data storage element transfers wireless network data to the wireless network application based on a provisioning priority. A wireless priority indicator may be based on a Third Generation Partnership Project (3GPP) network function type for its wireless network application, and the data storage element transfers wireless network data to the wireless network application based on a 3GPP network function type priority. A wireless priority indicator may be based on a media-conference service for its wireless network application, and the data storage element transfers wireless network data to the wireless network application based on a media-conference service priority. A wireless priority indicator may be based on a wireless network slice type for its wireless network application, and the data storage element transfers wireless network data to the wireless network application based on a wireless network slice type priority. A wireless priority indicator may be based on a wireless network core type for its wireless network application, and the data storage element transfers wireless network data to the wireless network application based on a wireless network core type priority. A wireless priority indicator may be based on a radio access technology for its wireless network application, and the data storage element transfers wireless network data to the wireless network application based on a radio access technology priority.

When the number of connections exceeds the connection threshold or when poor connection performance is detected, data storage element 102 may terminate the connections that have priority levels that are below a priority threshold. Data storage element 102 may terminate the connections that have usage levels that are below a usage threshold. Data storage element 102 may terminate the connections that have error rates that exceed an error threshold. When a new connection is requested by a network application, data storage element 102 determines the connection priority for the requested connection and denies or accepts the requested connection based on the connection priority. Data storage element 102 then serves any newly accepted connections based on the connection priority.

Data storage element 102 may use Internet Protocol (IP) address and/or IP port to prioritize the connections that have the same connection priority. For example, a special pool of IP addresses may receive preferential treatment over connections that share a common priority. Likewise, particular IP port numbers may receive preferential treatment over connections that have the same priority.

Wireless communication system 100 wirelessly communicates with wireless user devices (not shown) using wireless protocols like Wireless Fidelity, (WIFI), Fifth Generation New Radio (5GNR), Long Term Evolution (LTE), Low-Power Wide Area Network (LP-WAN), Near-Field Communications (NFC), Code Division Multiple Access (CDMA), Frequency Division Multiple Access (FDMA), Time Division Multiple Access (TDMA), and satellite data communications. Wireless communication system 100 comprises microprocessors, software, memories, transceivers, bus circuitry, and/or some other data processing components. The microprocessors comprise Digital Signal Processors (DSP), Central Processing Units (CPU), Graphical Processing Units (GPU), Application-Specific Integrated Circuits (ASIC), and/or some other data processing hardware. The memories comprise Random Access Memory (RAM), flash circuitry, disk drives, and/or some other type of data storage. The memories store software like operating systems, utilities, protocols, applications, and functions. The microprocessors retrieve the software from the memories and execute the software to drive the operation of wireless communication system 100 as described herein.

Figure 2:
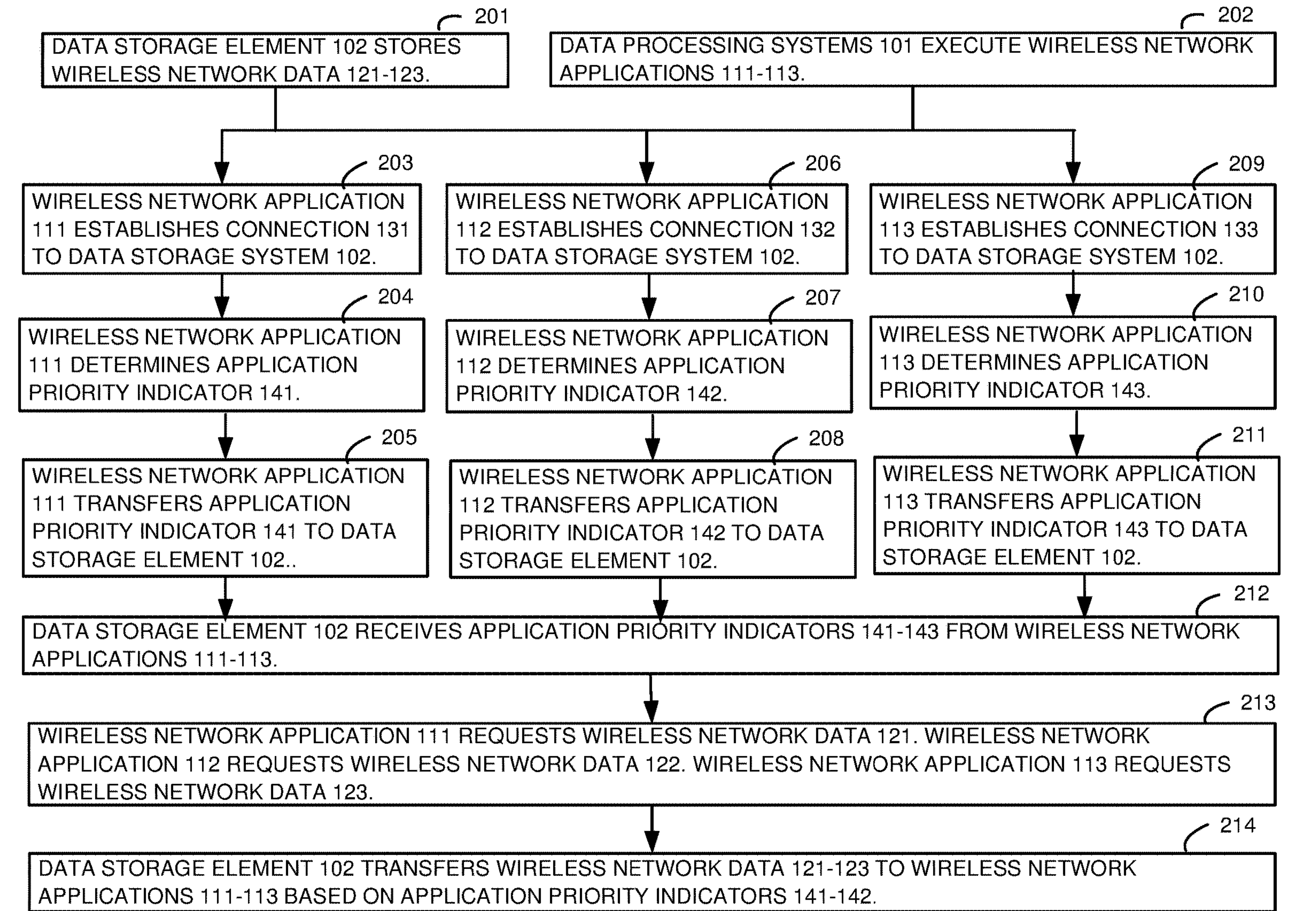
FIG. 2 illustrates an exemplary operation of the wireless communication system to transfer the wireless network data from the data storage element to the wireless network applications.

FIG. 2 illustrates an exemplary operation of wireless communication system 100 to transfer wireless network data 121-123 from data storage element 102 to wireless network applications 111-113. The operation may differ in other examples. Data storage element 102 stores wireless network data 121-123 (201). Data processing systems 101 execute wireless network applications 111-113 (202). Wireless network application 111 establishes connection 131 with data storage element 102 (203). Wireless network application 111 determines its application priority indicator 141—possibly by receiving information from data storage element 102 that indicates application priority indicator 141 (204). Wireless network application 111 transfers application priority indicator 141 to data storage element 102 over connection 131 (205). Wireless network application 112 establishes connection 132 with data storage element 102 (206). Wireless network application 112 determines its application priority indicator 142—possibly by reading application priority indicator 142 from a preconfigured location in application 112 (207). Wireless network application 112 transfers application priority indicator 142 to data storage element 102 over connection 132 (208). Wireless network application 113 establishes connection 133 with data storage element 102 (209). Wireless network application 113 determines its application priority indicator 143—possibly by querying a network database (210). Wireless network application 113 transfers application priority indicator 143 to data storage element 102 over connection 133 (211). Data storage element 102 receives application priority indicators 141-143 from wireless network applications 111-113 over connections 131-133 (212).

Wireless network application 111 requests wireless network data 121 from data storage element 102 over connection 131 (213). Contemporaneously, wireless network application 112 requests wireless network data 122 from data storage element 102 over connection 132 (213). Also contemporaneously, wireless network application 113 requests wireless network data 123 from data storage element 102 over connection 133 (213). Data storage element 102 transfers wireless network data 121-123 to wireless network applications 111-113 over connections 131-133 in a priority order that is based on application priority indicators 141-143 (214). The higher priority applications are served first. The average priority applications are served next. The lowest priority applications are served last—and may not be served at all.

Figure 3:
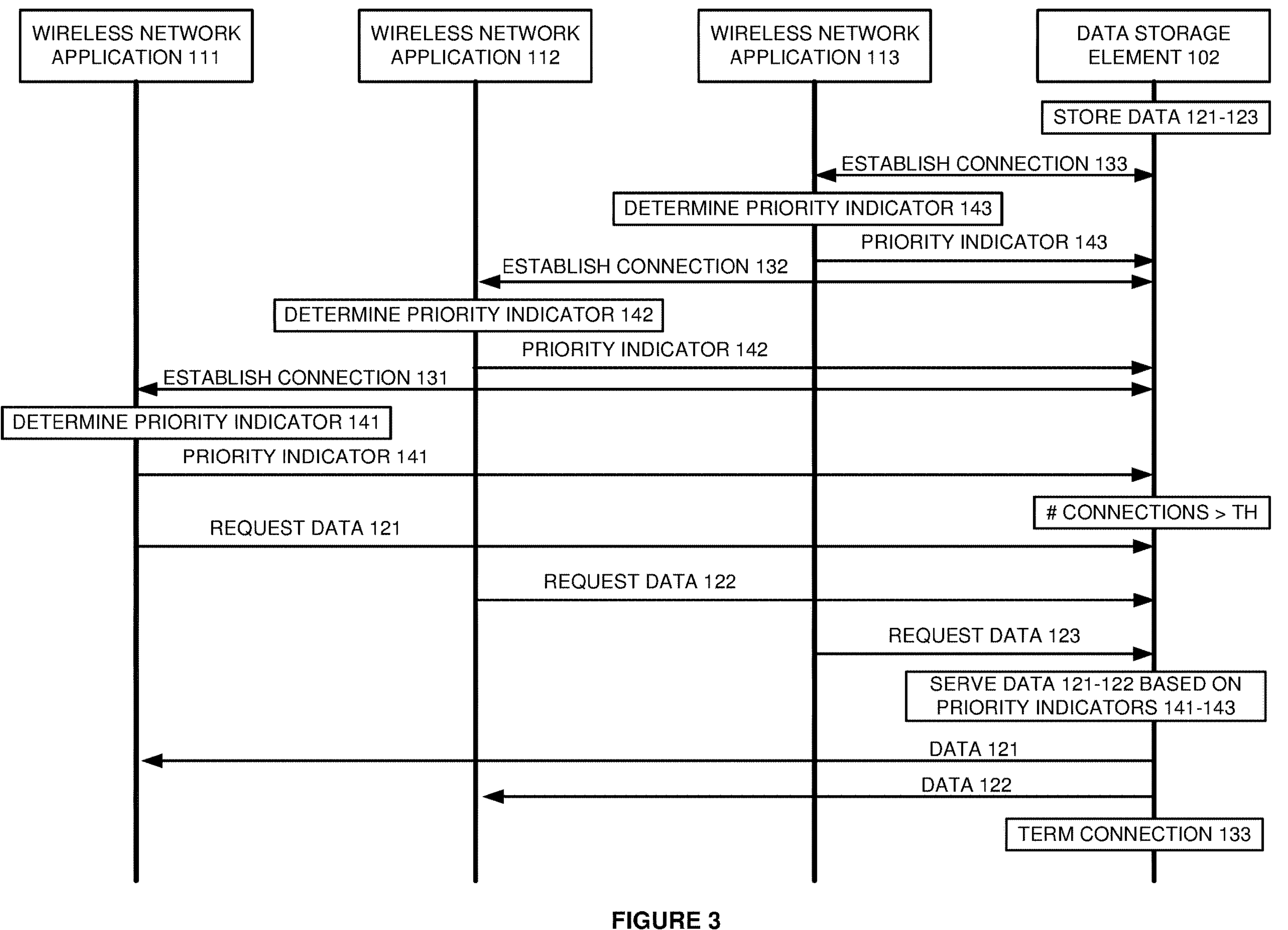
FIG. 3 illustrates an exemplary operation of the wireless communication system to transfer the wireless network data from the data storage element to the wireless network applications.

FIG. 3 illustrates an exemplary operation of wireless communication system 100 to transfer wireless network data 121-123 from data storage element 102 to wireless network applications 111-113. The operation may differ in other examples. Data storage element 102 stores wireless network data 121-123. Wireless network application 113 and data storage element 102 establish connection 133. Wireless network application 113 determines its application priority indicator 143 and transfers application priority indicator 143 to data storage element 102 over connection 133. Wireless network application 112 and data storage element 102 establish connection 132. Wireless network application 113 determines its application priority indicator 142 and transfers application priority indicator 142 to data storage element 102 over connection 132. Wireless network application 111 and data storage element 102 establish connection 131. Wireless network application 111 determines its application priority indicator 141 and transfers application priority indicator 141 to data storage element 102 over connection 131.

Data storage element 102 determines when the number of connections 131-133 exceeds a connection threshold. In this simplified example, the connection threshold is only two, but the connection threshold is typically higher. After the connection threshold is exceeded, wireless network application 111 requests wireless network data 121 from data storage element 102 over connection 131. Wireless network application 112 then requests wireless network data 122 from data storage element 102 over connection 132. In addition, wireless network application 113 requests wireless network data 123 from data storage element 102 over connection 133. Data storage element 102 serves wireless network data 121-122 to wireless network applications 111-112 based on the priorities of application priority indicators 141-143. Data storage element 102 first transfers wireless network data 121 to the highest priority wireless network application 111 over connection 131. Data storage element 102 then transfers wireless network data 122 to the next highest priority wireless network application 112 over connection 132. To conserve communication resources, data storage element 102 terminates the lowest priority connection 133 for wireless network application 113, and wireless network data 123 is not transferred.

Advantageously, data storage element 102 effectively serves wireless network applications 111-113 in times of overload and congestion. Thus, data storage element 102 reduces service outages to wireless network users. Moreover, wireless network applications 111-113 efficiently help data storage element 102 manage overloads and congestion. In particular, wireless network applications 111-113 provide effective support to data storage element 102 at the application layer based on UDR priorities that are not adequately understood at the transport layer.

Figure 4:
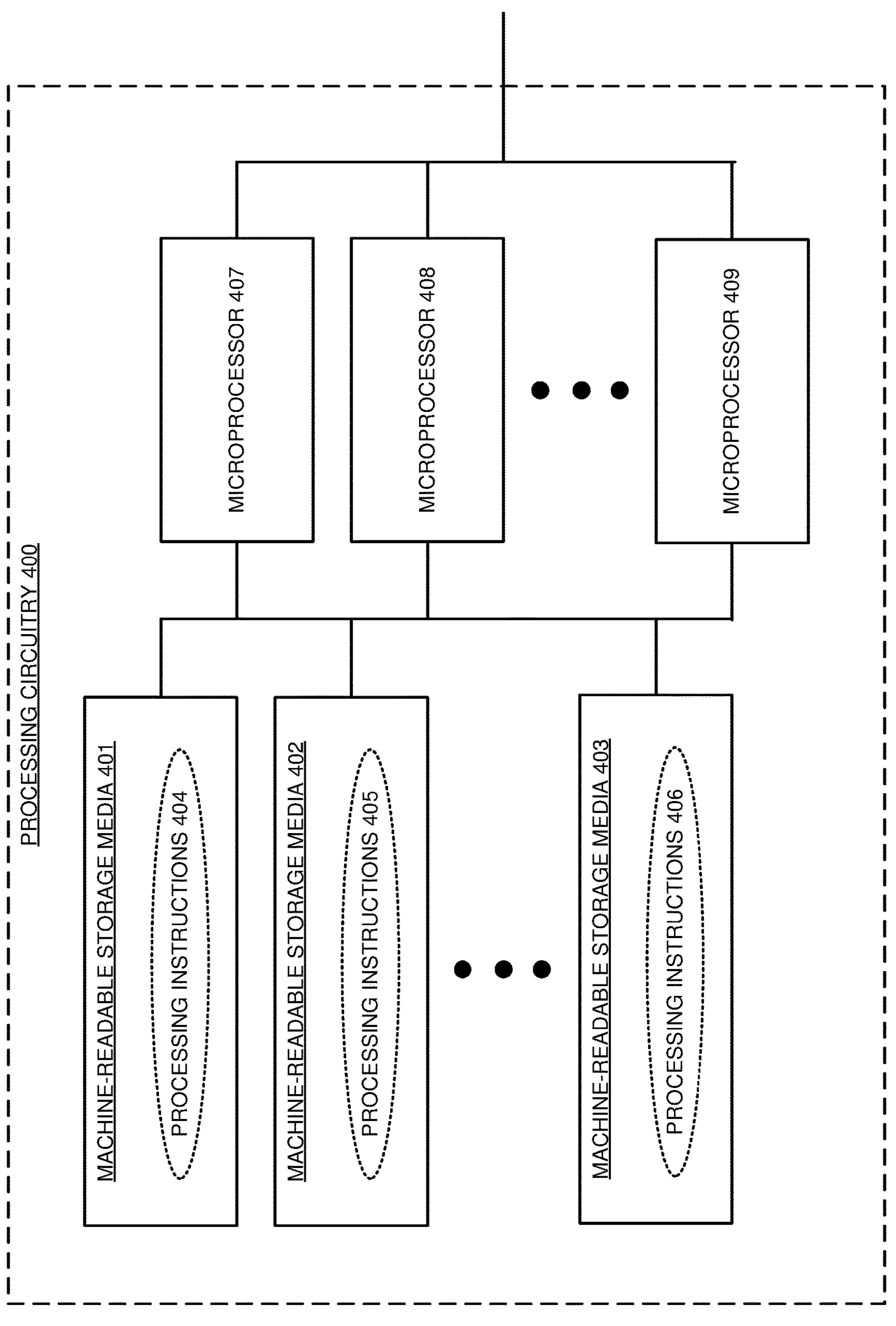
FIG. 4 illustrates exemplary processing circuitry to transfer wireless network data from a data storage element to wireless network applications.

FIG. 4 illustrates exemplary processing circuitry 400 to transfer wireless network data from a data storage element to wireless network applications. Processing circuitry 400 comprises an example of data processing systems 101 and data storage element 102, although systems 101 and element 102 may differ. Processing circuitry 400 comprises machine-readable storage media 401-403 and microprocessors 407-409 that are communicatively coupled. Machine-readable storage media 401-403 store processing instructions 404-406 in a non-transitory manner. Microprocessors 407-409 comprise DSPs, CPUs, GPUs, ASICs, and/or some other data processing hardware. Machine-readable storage media 401-403 comprises RAM, flash circuitry, disk drives, and/or some other type of data storage apparatus. Microprocessors 407-409 retrieve processing instructions 404-406 from non-transitory machine-readable storage media 401-403. Microprocessors 407-409 execute processing instructions 404-406 to transfer wireless network data from a data storage element to wireless network applications in priority order as described above for wireless communication system 100 and as described below for wireless communication networks 500, 600, 800 and 1000. The amount of storage media, microprocessors, and processing instructions that are shown in FIG. 4 is exemplary and may vary in other examples.

Figure 5:
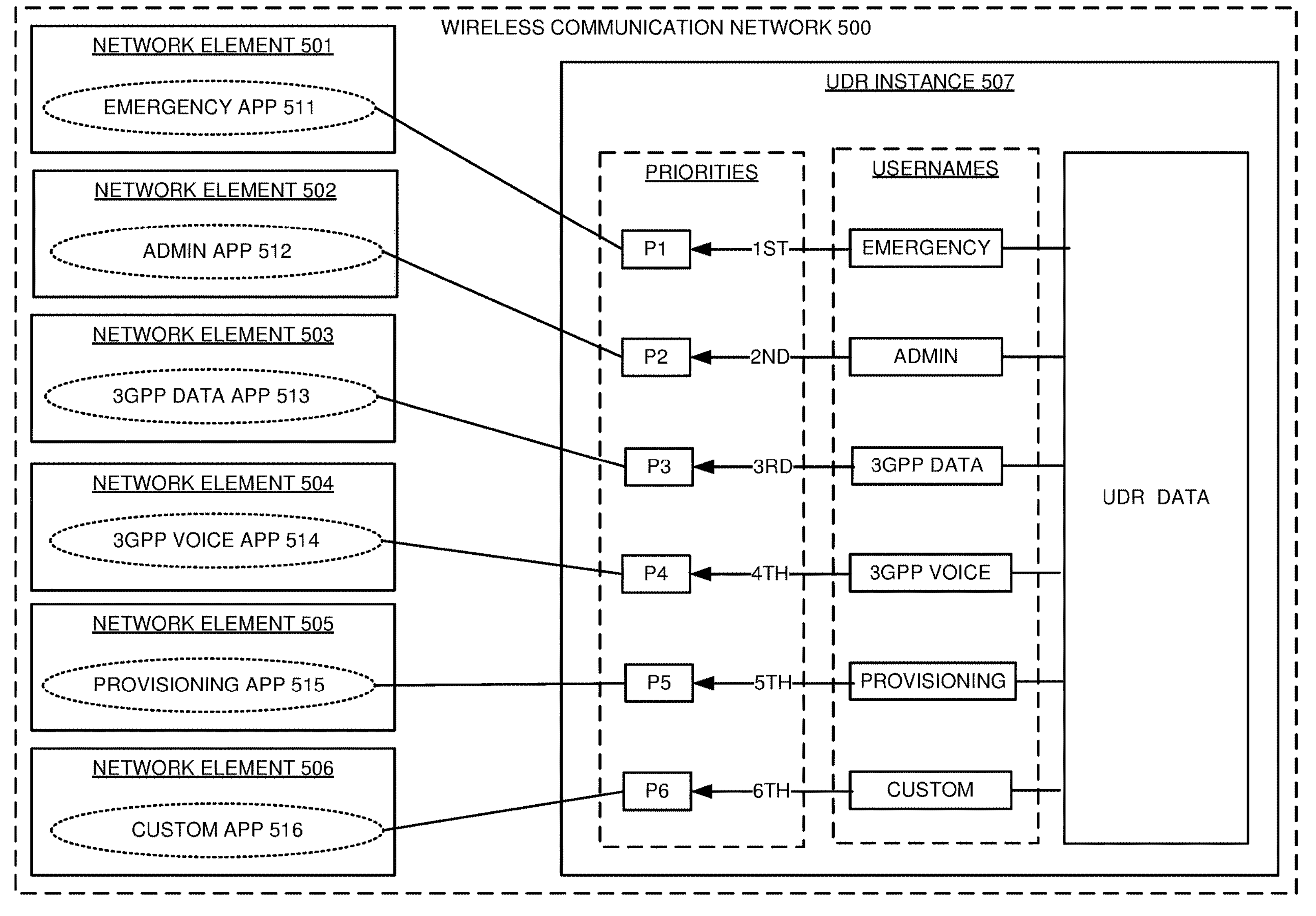
FIG. 5 illustrates an exemplary wireless communication network to transfer wireless network data from a Uniform Data Repository (UDR) instance to wireless network applications.

FIG. 5 illustrates exemplary wireless communication network 500 to transfer wireless network data from Uniform Data Repository (UDR) instance 507 to wireless network applications 511-516. Wireless communication network 500 comprises an example of wireless communication system 100, although system 100 may differ. Wireless communication network 500 comprises network elements 501-506 and UDR instance 507. Network element 501 comprises emergency application (APP) 511 that has a username which indicates its emergency status—and the emergency username has a first priority status (P1). Network element 502 comprises admin application 512 that has a username which indicates its administrative user—and the admin username has a second priority status (P2). Network element 503 comprises Third Generation Partnership Project (3GPP) data application 513 that has a username which indicates its 3GPP data status—and the 3GPP data username has a third priority status (P3). Network element 504 comprises 3GPP voice application 514 that has a username which indicates its 3GPP voice status—and the 3GPP voice username has a fourth priority status (P4). Network element 505 comprises provisioning application 515 that has a username which indicates its provisioning status—and the provisioning username has a fifth priority status (P5). Network element 506 comprises custom application 516 that has a username which indicates its custom status—and the custom username has a sixth priority status (P6).

Applications 511-516 establish Transmission Control Protocol (TCP) connections with UDR instance 507. The TCP connections may use Transport Layer Security (TLS) and/or Stream Control Transmission Protocol (SCTP) to provide reliable security and delivery. Applications 511-516 indicate their usernames to UDR instance 507 in a designated field of TCP segment headers during TCP connection establishment. UDR instance 507 stores the usernames and priorities in association with the TCP connections. UDR instance 507 determines when a TCP connection threshold is exceeded which indicates that UDR instance 507 is becoming overloaded or that UDR communications are becoming congested. When the TCP connection threshold is exceeded, UDR instance 507 serves UDR data to applications 511-516 in priority order, and some low-priority or error-prone TCP connections may be terminated. UDR instance 507 may serve the data to applications 501-506 in response to an application request, data subscription, or some other data-transfer trigger. Note that some TCP connections may be requested after the threshold is exceeded, and the newly requested TCP connections may be denied due to a lower priority. The newly requested TCP connections that are accepted are served based on their priority and may be terminated. Thus, applications 501-506 and UDR instance 507 use application layer knowledge of UDR priorities along with the typical transport layer tools to improve high-priority communications between applications 501-506 and UDR instance 507.

Figure 6:
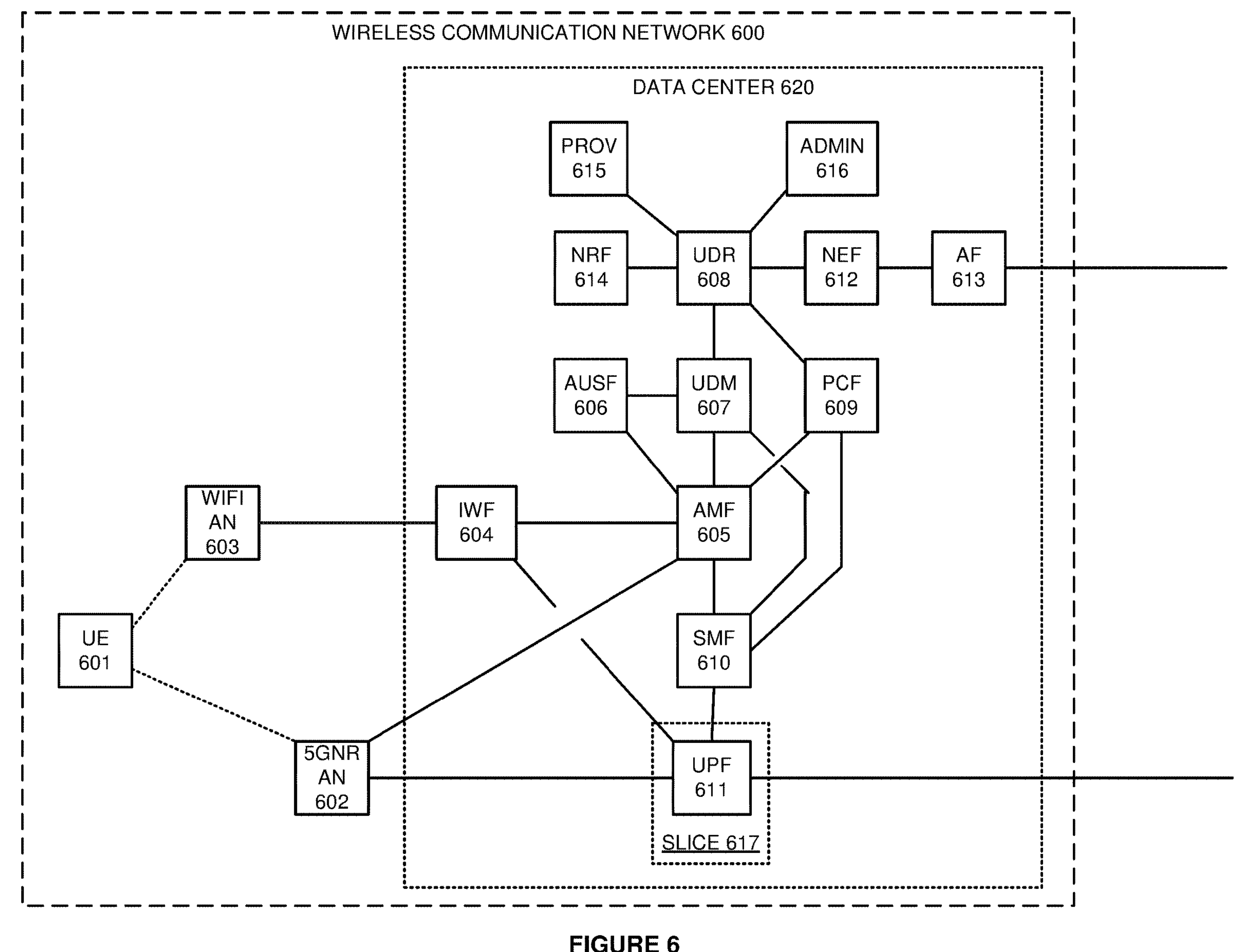
FIG. 6 illustrates an exemplary wireless communication network to transfer wireless network data from a UDR to wireless network functions.

FIG. 6 illustrates exemplary wireless communication network 600 to transfer wireless network data from UDR 608 to wireless network functions. Wireless communication network 600 comprises an example of wireless communication system 100 and wireless communication network 500, although system 100 and network 500 may differ. Wireless communication network 600 comprises UE 601, Fifth Generation New Radio Access Node (5GNR AN) 602, WIFI AN 603, and data center 620. Data center 620 comprises Non-Third Generation Partnership Project Interworking Function (IWF) 604, Access and Mobility Management Function (AMF) 605, Authentication Security Function (AUSF) 606, Unified Data Management (UDM) 607, Unified Data Repository (UDR) 608, Policy Control Function (PCF) 609, Session Management Function (SMF) 610, User Plane Function (UPF) 611, Network Exposure Function (NEF) 612, Application Function (AF) 613, Network Repository Function (NRF) 614, UDR provisioning system (PROV) 615, and UDR administrative system 616. Wireless network slice 617 comprises UPF 611. Wireless network slice 617 comprises network functionality that delivers Ultra-Reliable Low-Latency Communications (URLLC), enhanced Mobile Broadband (eMBB), Augmented Reality/Virtual Reality (AR/VR), Machine Type Communications (MTC), or some other network slice product.

5GNR AN 602 represents 5GNR radio access technology. WIFI AN 603 represents WIFI radio access technology. Data center 620 represents a 5G core type. In some examples, network application priority is based on radio access technology and/or core type.

Various network applications execute in the network elements (604-616) of wireless communication network 600. The network applications handle UDR provisioning, UDR configuration, data sessions, voice calling, short messaging, event notification, emergency communications, administrative control, network function types, wireless network slices, radio access technologies, core types, or some other network tasks. For example, UE 601 may indicate an emergency establishment cause during registration, and emergency network applications in AMF 605 and UDM 607 would retrieve data from UDR 608 to support emergency services for UE 601. The network applications have usernames, and the usernames have corresponding priorities in UDR 608. The usernames may indicate emergency, provisioning, administrative user, network function, data service, media-conference service, messaging service, wireless network slice, radio access technology, core type, or some other characterization of the network applications.

In operation, provisioning system 615 provisions UDR 608 with various data to serve UE 601. An administrative user of administrative system 616 configures UDR 608 to perform various tasks that support service delivery to UE 601. UDR 608 registers with NRF 614. NRF 614 is queried by UDM 607, PCF 609, and NEF 612 to discover UDR 608. NEF 612 subscribes to UDR 608 for event notification for UE 601.

UE 601 registers with AMF 605 over 5GNR AN 602 and/or WIFI AN 603-IWF 604. AMF 605 requests UE authentication from AUSF 606. AUSF 606 requests authentication data for UE 601 from UDM 607. UDM 607 requests the authentication data for UE 601 from UDR 608. UDR 608 transfers the authentication data for UE 601 to UDM 607. UDM 607 generates authentication credentials for UE 601 and transfers the authentication credentials to AUSF 606.

AUSF 606 transfers an authentication challenge to UE 601 over AMF 605 and either 5GNR AN 602 or WIFI AN 603-IWF 604. UE 601 responds to the authentication challenge, and AUSF 606 authenticates UE 601 based on the response. AUSF 606 notifies AMF 605 that UE 601 is authenticated. In response to authentication, AMF 605 requests subscriber data for UE 601 from UDM 607. UDM 607 requests the subscriber data for UE 601 from UDR 608. UDR 608 transfers the subscriber data for UE 601 to UDM 607. UDM 607 transfers the subscriber data for UE 601 to AMF 605. AMF 605 requests policy information for UE 601 from PCF 609. PCF 609 requests the policy information for UE 601 from UDR 608. UDR 608 transfers the policy information for UE 601 to PCF 609. PCF 609 transfers the policy information for UE 601 to AMF 605. AMF 605 interacts with SMF 610 to develop UE context for UE 601 like slices, services, service qualities, network addresses, and the like. AMF 605 transfers some UE context to IWF 604 or 5GNR AN 602. AMF 605 transfers some UE context to UE 601 over IWF 604-WIFI AN 603 or 5GNR AN 602. SMF 610 transfers some UE context to UPF 611 in wireless network slice 617.

Based on the UE context, UE 601 exchanges user data with external systems (not shown) over 5GNR AN 602-UPF 611 or WIFI AN 603-IWF 604-UPF 611. For example, UE 601 may browse the internet, participate in a voice call, exchange short messages, or perform some other service transactions. UDR 608 transfers event notifications for UE 601 (authentication, location, service usage) to NEF 612 in response to the subscription. NEF 612 exposes the event notifications for UE 601 to external systems (not shown) over AF 613.

The network applications in UDM 607, PCF 609, NEF 612, NRF 614, provisioning 615, and admin 616 establish TCP connections to UDR 608 and transfer their usernames to UDR 608 in the TCP headers. UDR 608 stores the usernames and priorities for the TCP connections. UDR 608 detects when the number of TCP connections exceeds a connection threshold which is typically set at 80-90% of the maximum number of supportable connections. When the number of TCP connections exceeds the connection threshold, UDR 608 serves the TCP connections based on the TCP connection priorities which are based on the network application usernames. UDR 608 may give a TCP connection a high-priority, average priority, or low priority.

When the number of TCP connections exceeds the connection threshold or when poor connection performance is detected, UDR 608 may terminate the TCP connections that have priority levels below a priority threshold. UDR 608 may terminate the TCP connections that have usage levels below a usage threshold. UDR 608 may terminate the TCP connections that have error rates that exceed an error threshold. When a new TCP connection is requested by a network application, UDR 608 determines the TCP connection priority and denies or accepts the requested TCP connection based on the TCP connection priority. UDR 608 serves the newly accepted TCP connection based on its TCP connection priority. UDR 608 may use Internet Protocol (IP) address and/or IP port to prioritize the TCP connections that have the same TCP connection priority.

Figure 7:
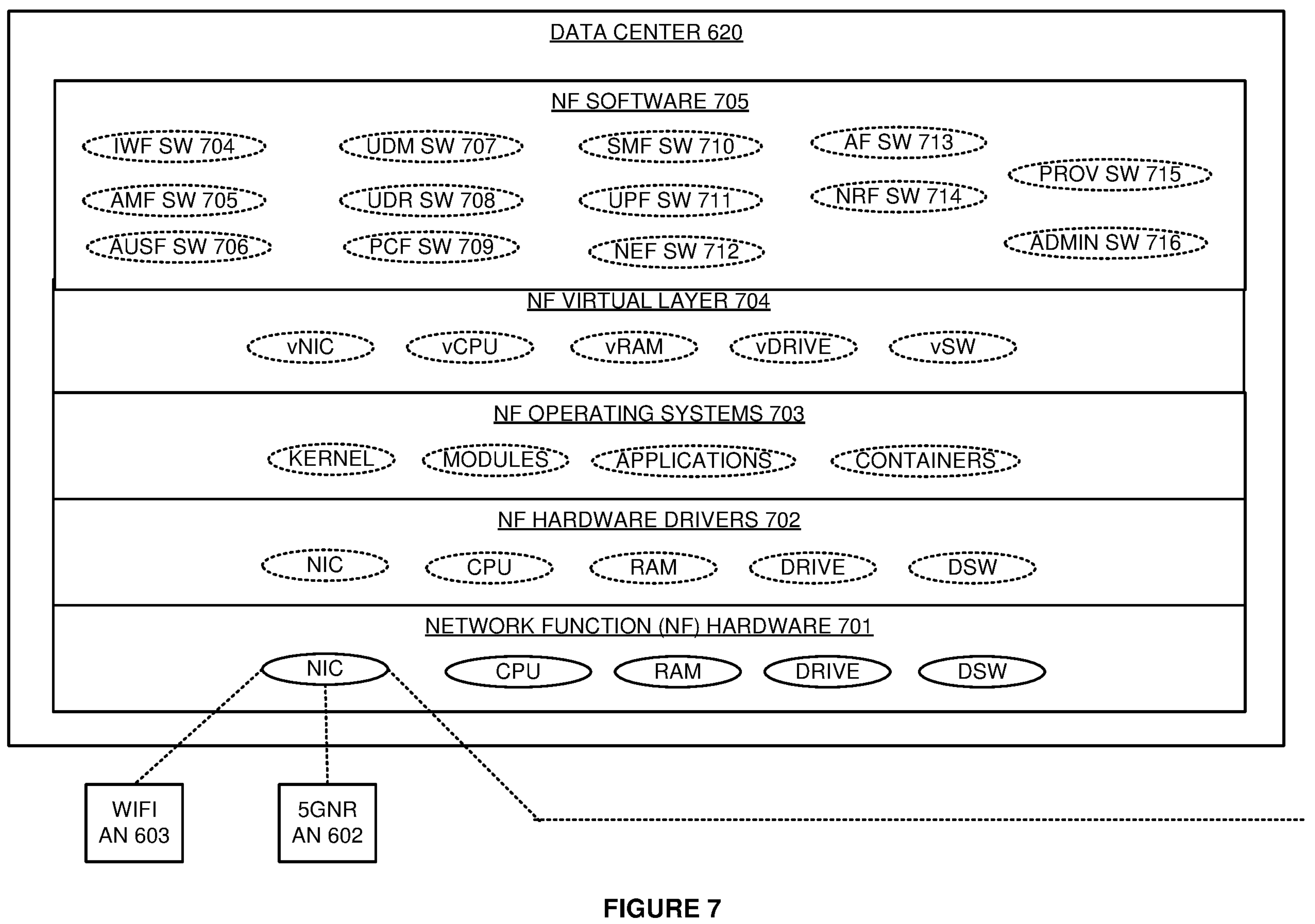
FIG. 7 illustrates an exemplary data center in the wireless communication network to transfer the wireless network data from the UDR to the wireless network functions.

FIG. 7 illustrates exemplary data center 620 in wireless communication network 600 to transfer the wireless network data from UDR 608 to the wireless network functions. Data center 620 comprises an example of data processing systems 101, data storage element 102, processing circuitry 400, network elements 501-506, and UDR instance 507, although systems 101, element 102, circuitry 400, elements 501-506, and instance 507 may differ. Data center 620 comprises NF hardware 701, NF hardware drivers 702, NF operating systems 703, NF virtual layer 704, and NF Software (SW) 705. NF hardware 701 comprises Network Interface Cards (NICs), CPU, RAM, Flash/Disk Drives (DRIVE), and Data Switches (DSW). NF hardware drivers 702 comprise software that is resident in the NIC, CPU, RAM, DRIVE, and DSW. NF operating systems 703 comprise kernels, modules, applications, and containers. NF virtual layer 704 comprises vNIC, vCPU, vRAM, vDRIVE, and vSW. NF SW 705 comprises IWF SW 704, AMF SW 705, AUSF SW 706, UDM SW 707, UDR SW 708, PCF SW 709, SMF SW 710, UPF SW 711, NEF SW 712, AF SW 713, NRF SW 714, provisioning SW 715, and administrative SW 716. The NIC in NF hardware 701 are coupled to 5GNR AN 602, WIFI AN 603, and external systems. NF hardware 701 executes NF hardware drivers 702, NF operating systems 703, NF virtual layer 704, and NF SW 705 to form and operate IWF 604, AMF 605, AUSF 606, UDM 607, UDR 608, PCF 609, SMF 610, UPF 611, NEF 612, AF 613, NRF 614, provisioning system 615, and administrative system 616. Network data center 620 may be located at a single site or be distributed across multiple geographic locations.

Figure 8:
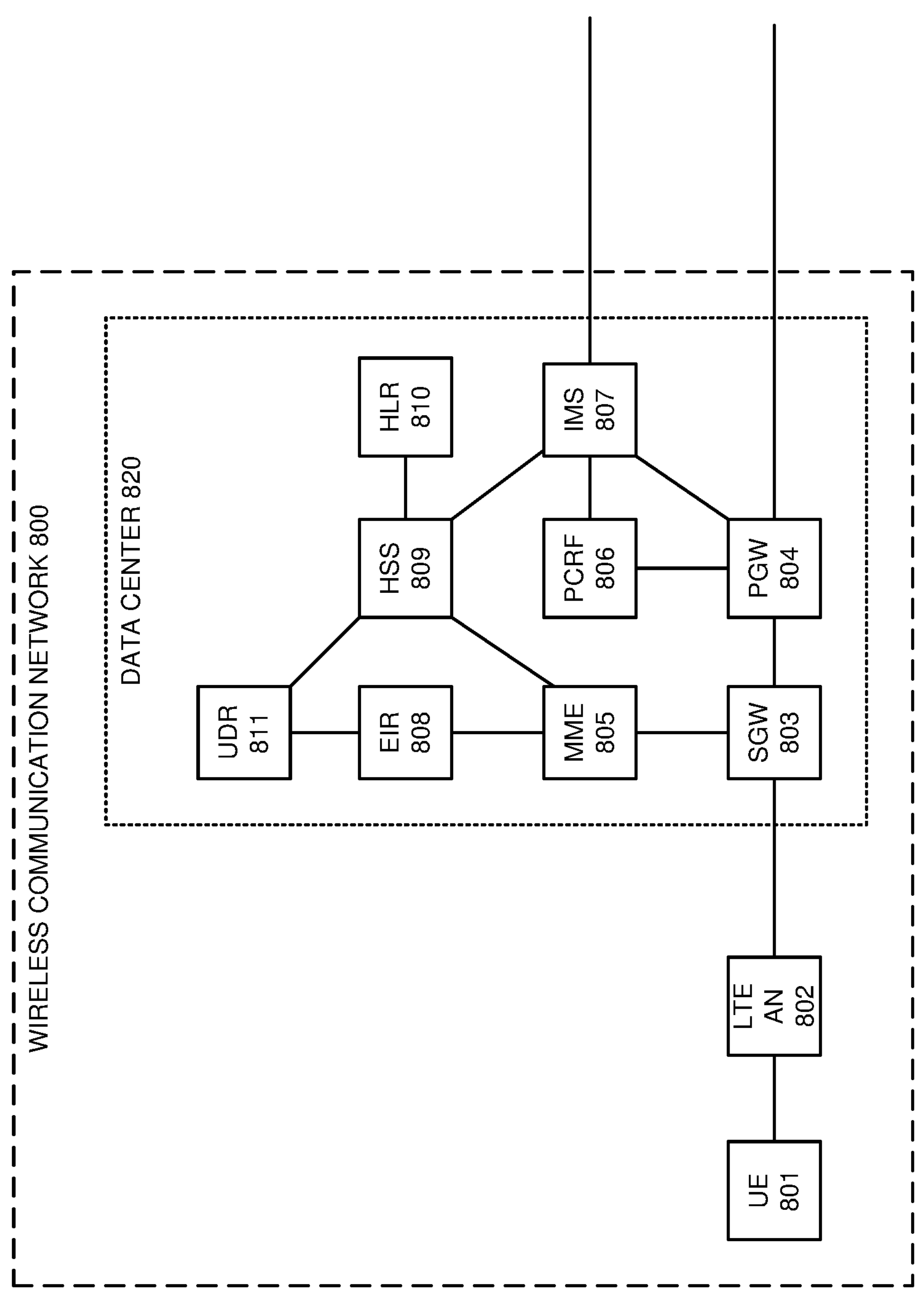
FIG. 8 illustrates an exemplary wireless communication network to transfer wireless network data from a UDR to wireless network elements.

FIG. 8 illustrates exemplary wireless communication network 800 to transfer wireless network data from UDR 811 to wireless network elements. Wireless communication network 800 comprises an example of wireless communication system 100 and wireless communication network 500, although system 100 and network 500 may differ. Wireless communication network 800 comprises UE 801, Long Term Evolution AN 802, and data center 820. Data center 820 comprises Serving Gateway (SGW) 803, Packet Data Network Gateway (PGW) 804, Mobility Management Entity (MME) 805, Policy Charging, and Rules Function (PCRF) 806, Internet Protocol Multimedia Control Subsystem (IMS) 807, Equipment Identity Register (EIR) 808, Home Subscriber System (HSS) 809, Home Location Register (HLR), and Uniform Data Repository (UDR) 811.

Various network applications execute in the network elements (803-811) of wireless communication network 800. The network applications handle data sessions, voice calling, short messaging, emergency communications, or some other network tasks. For example, UE 801 may indicate an emergency establishment cause during registration, and emergency network applications in MME 802 and HSS 809 would retrieve data from UDR 811 to support emergency services for UE 801. The network applications have usernames, and the usernames have corresponding priorities in UDR 811. The usernames may indicate emergency, provisioning, administrative user, network element, data service, media-conference service, messaging service, radio access technology, core type, or some other characterization of the network applications. LTE AN 802 represents an LTE radio access technology.

LTE AN 802 represents an LTE radio access technology. Data center 820 represents a 4G core type. In some examples, TCP connection priority is based on radio access technology and/or core type.

The network applications establish TCP connections to UDR 811 and transfer their usernames to UDR 811 in the TCP headers. UDR 811 stores the usernames and priorities for the TCP connections. UDR 811 detects when the number of TCP connections exceeds a connection threshold which is typically set at 80-90% of the maximum number of supportable connections. When the number of TCP connections exceeds the connection threshold, UDR 811 serves the TCP connections based on the TCP connection priorities which are based on the network application usernames. UDR 811 may give a TCP connection a high-priority, average priority, or low priority. UDR 811 may terminate the TCP connections that have priority levels below a priority threshold. UDR 811 may terminate the TCP connections that have usage levels below a usage threshold. UDR 811 may terminate the TCP connections that have error rates that exceed an error threshold. When a new TCP connection is requested by a network application, UDR 811 determines the TCP connection priority and denies the request or serves the accepted TCP connection based on the TCP connection priority.

Figure 9:
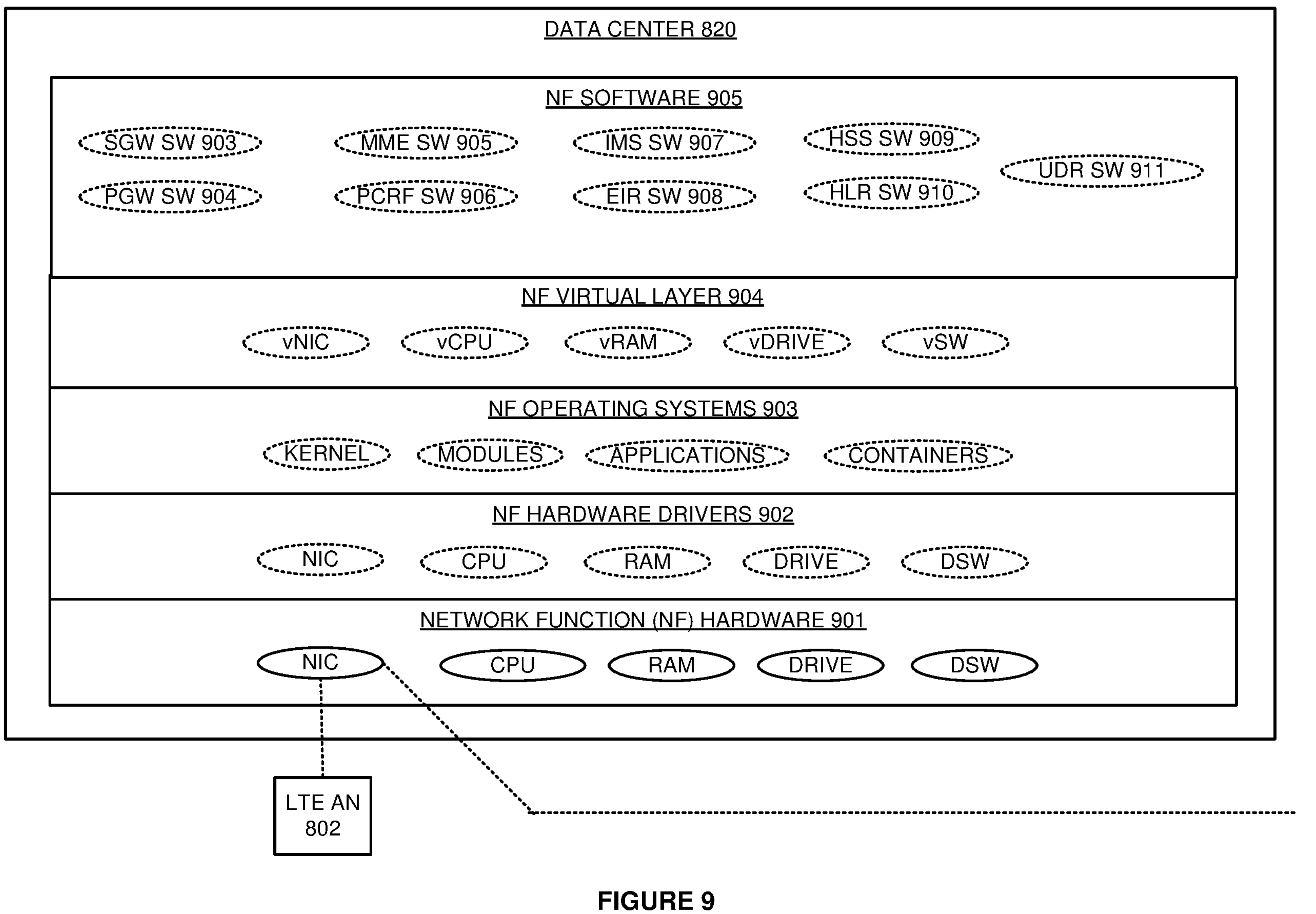
FIG. 9 illustrates an exemplary data center in a wireless communication network to transfer the wireless network data from the UDR to the wireless network elements.

FIG. 9 illustrates exemplary data center 920 in wireless communication network 800 to transfer the wireless network data from UDR 811 to the wireless network elements. Data center 820 comprises an example of data processing systems 101, data storage element 102, processing circuitry 400, network elements 501-506, and UDR instance 507, although systems 101, element 102, circuitry 400, elements 501-506, and instance 507 may differ. Data center 820 comprises NF hardware 901, NF hardware drivers 902, NF operating systems 903, NF virtual layer 904, and NF Software (SW) 905. NF hardware 901 comprises Network Interface Cards (NICs), CPU, RAM, Flash/Disk Drives (DRIVE), and Data Switches (DSW). NF hardware drivers 902 comprise software that is resident in the NIC, CPU, RAM, DRIVE, and DSW. NF operating systems 903 comprise kernels, modules, applications, and containers. NF virtual layer 904 comprises vNIC, vCPU, vRAM, vDRIVE, and vSW. NF SW 905 comprises SGW SW 803, PGW SW 904, MME SW 905, PCRF SW 906, IMS SW 907, EIR SW 908, HSS SW 909, HLR SW 910, and UDR SW 911. The NIC in NF hardware 901 are coupled to LTE AN 802 and external systems. NF hardware 901 executes NF hardware drivers 902, NF operating systems 903, NF virtual layer 904, and NF SW 905 to form and operate SGW 803, PGW 804, MME 805, PCRF 806, IMS 807, EIR 808, HSS 809, HLR 810, and UDR 811. The NIC in NF hardware 901 are coupled to LTE AN 802 and external systems. Network data center 820 may be located at a single site or be distributed across multiple geographic locations.

Figure 10:
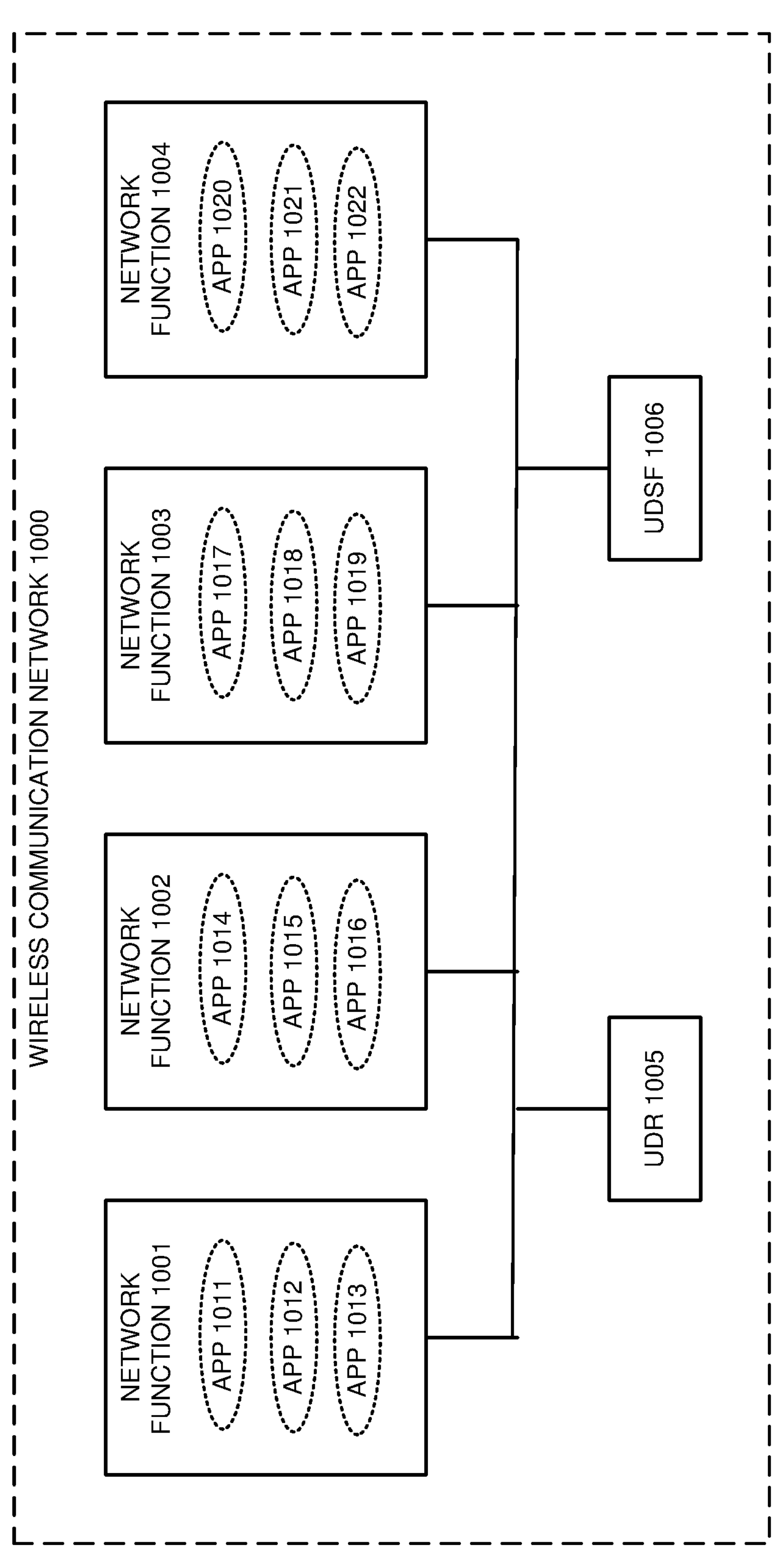
FIG. 10 illustrates an exemplary wireless communication network to transfer wireless network data from a UDR and from an Unstructured Data Storage Function (UDSF) to wireless network functions.

FIG. 10 illustrates exemplary wireless communication network 1000 to transfer wireless network data from UDR 1005 and from Unstructured Data Storage Function (UDSF) 1006 to wireless network functions 1001-1004. Wireless communication network 1000 comprises an example of wireless communication system 100 and wireless communication networks 500, 600, and 800, although system 100 and networks 500, 600, and 800 may differ. Wireless communication network 1000 comprises network functions 1001-1004, UDR 1005, and UDSF 1006. Network function 1001 comprises network applications (APP) 1011-1013. Network function 1002 comprises network applications 1014-1016. Network function 1003 comprises network applications 1017-1019. Network function 1004 comprises network applications 1020-1022. Network applications 1011-1022 are associated with UDR provisioning, UDSF provisioning, UDR configuration, UDSF configuration, data sessions, voice calling, short messaging, event notification, emergency communications, administrative control, network function types, wireless network slices, radio access technologies, core types, or some other network characteristics.

Network applications 1011-1022 establish Transmission Control Protocol (TCP) connections with UDR 1005 and UDSF 1006. Network applications 1011-1022 indicate their usernames to UDR 1005 and UDSF 1006 in a designated field of TCP headers during TCP connection establishment. UDR 1005 and UDSF 1006 store the usernames and priorities in association with the TCP connections. UDR 1005 and UDSF 1006 determine when their TCP connection threshold is exceeded which indicates that UDR 1005 and/or UDSF 1006 is becoming overloaded or their communications are becoming congested. When the TCP connection threshold is exceeded, UDR 1005 and/or UDSF 1006 serve data to applications 1011-1022 in priority order, and some low-priority, idle, or error-prone TCP connections may be terminated. UDR 1005 and UDSF 1006 may serve the data to applications 1011-1022 in response to an application request, event subscription, or some other data-transfer trigger. Note that some TCP connections may be requested after the threshold is exceeded and the newly requested TCP connections may be denied or accepted based on their priority. The newly accepted TCP connections are served or terminated based on their priority.

Figure 11:
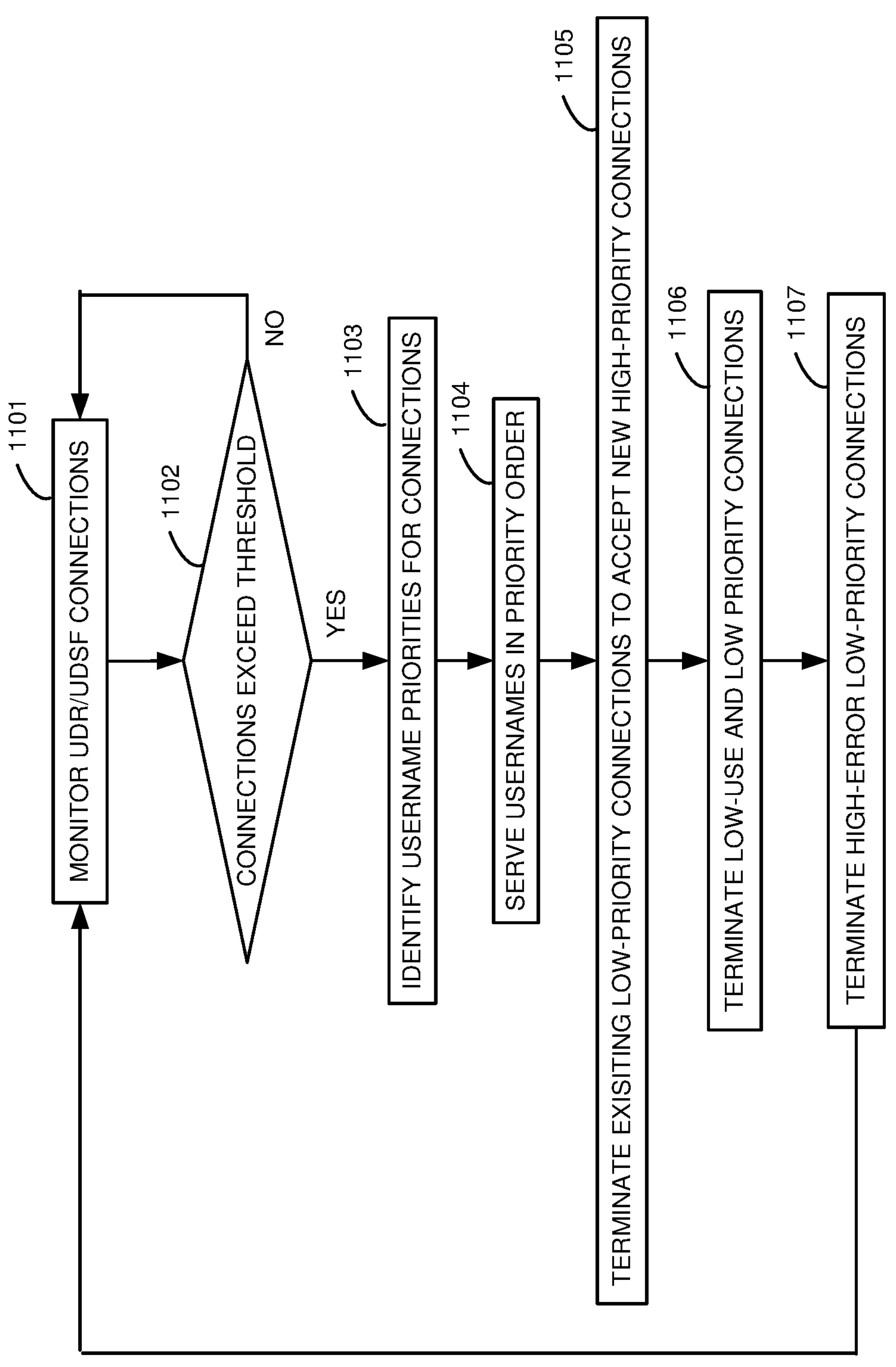
FIG. 11 illustrates an exemplary operation of the wireless communication network to transfer the wireless network data from the UDR and from the UDSF to the wireless network functions.

FIG. 11 illustrates an exemplary operation of a wireless communication network to transfer the wireless network data from a UDR and UDSF to wireless network applications. The operation may differ in other examples. The UDR and the UDSF monitor their TCP connections by amount, usage, and error-rate (1101). The UDR and UDSF determine when their individual amounts of TCP connections exceeds their individual connection thresholds (1102). When their TCP connection threshold is exceeded (1102), the UDR and/or UDSF identify username priorities for the TCP connections. The UDR and/or UDSF serve the usernames in priority order (1104). The UDR and/or UDSF terminate existing low-priority TCP connections to serve new high-priority TCP connections (1105). The UDR and/or UDSF terminate low-use TCP connections that have low-priority (1106). The UDR and/or UDSF terminate high-error TCP connections that have low-priority (1107). The operation repeats (1101).

The wireless communication system circuitry described above comprises computer hardware and software that form special-purpose data communication circuitry to communicate between wireless network applications and a data storage element. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose data communication circuitry to communicate between wireless network applications and a data storage element.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method to transfer wireless network data from a Uniform Data Repository (UDR) to wireless network applications, the method comprising:

the wireless network applications individually determining application names and individually transferring the application names to the UDR;

the UDR receiving the application names from the wireless network applications and determining when an amount of connections from the wireless network applications to the UDR exceeds a connection threshold; and when the amount of the connections from the wireless network applications to the UDR exceeds the connection threshold, the UDR determining priorities based on the application names for the wireless network applications and transferring the wireless network data to the wireless network applications based on the priorities.

2. The method of claim 1 wherein at least one of the application names comprises an emergency application name.

3. The method of claim 1 wherein at least one of the application names comprises an administrative application name.

4. The method of claim 1 wherein at least one of the application names comprises a Third Generation Partnership Project (3GPP) network function application name.

5. The method of claim 1 wherein at least one of the application names comprises a media-conference application name.

6. The method of claim 1 wherein at least one of the application names comprises a wireless network slice application name.

7. The method of claim 1 wherein the wireless network applications comprise at least one of a Uniform Data Management (UDM) application, Access and Mobility Management (AMF) application, Session Management Function (SMF) application, Policy Control Function (PCF) application, Network Exposure Function (NEF) application, and Short Message Service Function (SMSF) application.

8. A wireless communication system to transfer wireless network data from a Uniform Data Repository (UDR) to wireless network applications, the wireless communication system comprising:

network circuitry to execute the wireless network applications and the UDR;

the wireless network applications to determine application usernames;

the wireless network applications to establish connections to the UDR and transfer the application usernames to the UDR over the connections;

the UDR to receive the application usernames from the wireless network applications over the connections;

the UDR to determine when an amount of the connections from the wireless network applications to the UDR exceeds a connection threshold; and when the amount of the connections from the wireless network applications to the UDR exceeds the connection threshold, the UDR to determine connection priorities based on the application usernames and transfer the wireless network data to the wireless network applications based on the connection priorities.

9. The wireless communication system of claim 8 wherein the application usernames comprise at least one of an emergency username, administrative username, Third Generation Partnership Project (3GPP) network function username, media-conference service username, and switch provisioning username.

10. The wireless communication system of claim 8 further comprising, when the amount of the connections from the wireless network applications to the UDR exceeds the connection threshold, the UDR to terminate ones of the connections having usage levels below a usage threshold.

11. The wireless communication system of claim 8 further comprising, when the amount of the connections from the wireless network applications to the UDR exceeds the connection threshold, the UDR to terminate ones of the connections having error rates that exceeds an error threshold.

12. The wireless communication system of claim 8 further comprising, when the amount of the connections from the wireless network applications to the UDR exceeds the connection threshold, the UDR to terminate ones of the connections having connection priorities below a priority threshold.

13. The wireless communication system of claim 8 wherein the wireless network applications are to transfer the application usernames to the UDR in a Transmission Control Protocol (TCP) header.

14. One or more non-transitory computer-readable storage media having instructions stored thereon that, when executed by one or more processors, cause the processors to perform operations comprising:

receiving, by a Uniform Data Registry (UDR), application names from wireless network applications and determining when an amount of connections from the wireless network applications to the UDR exceeds a connection threshold, wherein the wireless network applications individually determine the application names and individually transfer the application names to the UDR; and when the amount of the connections from the wireless network applications to the UDR exceeds the connection threshold, determining, by the UDR, priorities based on the application names for the wireless network applications and transferring the wireless network data to the wireless network applications based on the priorities.

15. The one or more non-transitory computer-readable storage media of claim 14 wherein at least one of the application names comprises an emergency application name.

16. The one or more non-transitory computer-readable storage media of claim 14 wherein at least one of the application names comprises an administrative application name.

17. The one or more non-transitory computer-readable storage media of claim 14 wherein at least one of the application names comprises a Third Generation Partnership Project (3GPP) network function application name.

18. The one or more non-transitory computer-readable storage media of claim 14 wherein at least one of the application names comprises a media-conference application name.

19. The one or more non-transitory computer-readable storage media of claim 14 wherein at least one of the application names comprises a wireless network slice application name.

20. The one or more non-transitory computer-readable storage media of claim 14 wherein the wireless network applications comprise at least one of a Uniform Data Management (UDM) application, Access and Mobility Management (AMF) application, Session Management Function (SMF) application, Policy Control Function (PCF) application, Network Exposure Function (NEF) application, and Short Message Service Function (SMSF) application.

* * * * *